United States Patent
Green et al.

(10) Patent No.: US 11,570,153 B2
(45) Date of Patent: Jan. 31, 2023

(54) VIRTUAL MACHINE PERFECT FORWARD SECRECY

(71) Applicant: International Business Machines Corporation, Armonk, NY (US)

(72) Inventors: Matthew Green, Ashmore (AU); Narayana Aditya Madineni, Southport (AU); Michael W. Gray, Guanaba (AU); Leigh S. McLean, Nerang (AU)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 16/816,467

(22) Filed: Mar. 12, 2020

(65) Prior Publication Data

US 2021/0288943 A1 Sep. 16, 2021

(51) Int. Cl.
*G06F 16/23* (2019.01)
*G06F 3/06* (2006.01)
(Continued)

(52) U.S. Cl.
CPC ........ *H04L 63/0428* (2013.01); *G06F 3/0623* (2013.01); *G06F 3/0631* (2013.01);
(Continued)

(58) Field of Classification Search
CPC . H04L 63/0428; H04L 9/0861; G06F 3/0623; G06F 3/0631; G06F 3/0652;
(Continued)

(56) References Cited

U.S. PATENT DOCUMENTS 9,552,495 B2 1/2017 Yang et al.
9,710,400 B2 7/2017 Chaturvedi et al.
(Continued)

FOREIGN PATENT DOCUMENTS

WO 2018209138 A1 11/2018

OTHER PUBLICATIONS

PCT/EP2021/056100, Notification of Transmittal of the International Search Report and the Written Opinion of the International Searching Authority, or the Declaration, dated Jun. 4, 2021.
(Continued)

*Primary Examiner* — Masud K Khan
(74) *Attorney, Agent, or Firm* — Robert J. Shatto

(57) ABSTRACT

Provided is a method, a computer program product, and a system for providing perfect forward secrecy in virtual machines. The method includes receiving a secure memory allocation function from an application, including a connection secret to be stored in memory. The method further includes allocating memory for the connection secret according to the memory size parameter and storing an entry relating to the connection secret in a secure database. The memory information includes a memory location and a memory size of the memory. The method also includes monitoring an operation state relating to the virtual machine. The method further includes receiving, from the application, a secure deallocation function relating to the connection secret and retrieving the memory information from the secure database. The method also includes deleting the connection from the memory and sanitizing the memory location logged by the memory information.

17 Claims, 8 Drawing Sheets

(51) Int. Cl.
*G06F 9/455* (2018.01)
*G06F 11/30* (2006.01)
*G06F 21/62* (2013.01)
*H04L 9/40* (2022.01)
*H04L 9/08* (2006.01)

(52) U.S. Cl.
CPC .......... *G06F 3/0652* (2013.01); *G06F 3/0673* (2013.01); *G06F 9/45558* (2013.01); *G06F 11/301* (2013.01); *G06F 11/3055* (2013.01); *G06F 16/2379* (2019.01); *G06F 21/6218* (2013.01); *H04L 9/0861* (2013.01); *G06F 2009/45583* (2013.01); *G06F 2009/45587* (2013.01)

(58) Field of Classification Search
CPC .. G06F 3/0673; G06F 9/45558; G06F 11/301; G06F 11/3055; G06F 16/2379; G06F 21/6218; G06F 2009/45583; G06F 2009/45587; G06F 21/54; G06F 21/78
See application file for complete search history.

(56) References Cited

U.S. PATENT DOCUMENTS

| | | | |
|---|---|---|---|
| 2014/0095821 A1* | 4/2014 | Yang | G06F 3/0619 711/162 |
| 2014/0164791 A1 | 6/2014 | Chaturvedi et al. | |
| 2014/0365834 A1 | 12/2014 | Stone | |
| 2015/0033221 A1 | 1/2015 | Chari | |
| 2017/0005990 A1* | 1/2017 | Birger | H04L 9/0819 |
| 2017/0346851 A1 | 11/2017 | Drake | |
| 2018/0330081 A1* | 11/2018 | Hua | G06F 9/4812 |

OTHER PUBLICATIONS

Elrabaa et al., "Secure Computing Enclaves Using FPGAs," IEEE Transactions on Dependable and Secure Computing, Aug. 2019, pp. 1-20, IEEE.

Monroe, D., "How Does Azure Encrypt Data?", Blog/Microsoft Azure, Jul. 5, 2018, 14 pages. https://cloudacademy.com/blog/how-does-azure-encrypt-data/.

Rahm, J., "Lightboard Lesson: Perfect Forward Secrecy Inspection Visibility," DevCentral, Nov. 14, 2018, 9 pgs. https://devcentral.f5.com/s/articles/lightboard-lesson-perfect-forward-secrecy-inspection-visibility-32503.

Shaw, D., "Secmalloc—a secure memory library," jabberwocky, Printed Nov. 22, 2019, 2 pages. http://www.jabberwocky.com/software/secmalloc/.

Sastry, N., "Smalloc: secure malloc," usenix legacy content, May 12, 2012, 3 pages. https://www.usenix.org/legacy/publications/library/proceedings/sec03/tech/full_papers/broadwell/broadwell_html/node8.html.

"VMware VSockets Documentation," vmware support, printed Nov. 22, 2019, 2 pages. https://www.vmware.com/support/developer/vmci-sdk/.

Andy, "Adventures in entropy, part 1," The Ongoing Struggle, Blog, Jun. 6, 2016, 13 pages. http://strugglers.net/~andy/blog/2010/06/06/adventures-in-entropy-part-1/.

"How do I know if I'm working on a Virtual Machine or not?", Server Fault Questions, Printed: Mar. 11, 2020, 5 pages. https://serverfault.com/questions/109154/how-do-i-know-if-im-working-on-a-virtual-machine-or-not.

Mell et al., "The NIST Definition of Cloud Computing", Recommendations of the National Institute of Standards and Technology, Special Publication 800-145, Sep. 2011, 7 pages.

* cited by examiner

VIRTUAL MACHINE PERFECT FORWARD SECRECY

BACKGROUND

The present disclosure relates to virtual machine security, and more specifically, to providing perfect forward secrecy capabilities to virtual machines.

Perfect forward secrecy refers to a feature that describes a means of preventing session keys from being compromised even if the private key of a server is compromised. To do so, protocols relating to perfect forward secrecy generate unique session keys for every session initiated by a user. If a session key is compromised, data exchanged outside of that particular session remains protected.

A virtual machine is an emulated computer system created using software. The virtual machines use physical system resources, such as the processor, random-access memory (RAM), and disk storage. While in operation, a virtual machine can be categorized as being within a type of operation state. These states include, but are not limited to, running, shutdown, suspended, and checkpoint/snapshot. Depending on the state of the virtual machine, session keys and other connection secrets can be either stored in memory, disk storage, or both.

SUMMARY

Embodiments of the present disclosure include a perfect forward secrecy system for providing secure memory allocation functions in a virtual machine, including a data processing component and at least one memory component. The system also includes local data storage having stored thereon computer-executable program code, which, when executed by the data processing component, causes the data processing component to receive, from an application operating within a virtual machine, a secure memory allocation function for a connection secret. The secure memory allocation function includes a memory size parameter. The system also causes the data processing component to allocate memory for the connection secret according to the memory size parameter. The memory includes a memory location and a memory size. The system also causes the data processing component to transmit the memory location and the memory size to the virtual machine host to be stored as an entry in a secure database. The system also causes the data processing component to store the entry in the secure database and to monitor an operation state relating to the virtual machine and sanitize the memory based on a change to the operation state of the virtual machine.

Additional embodiments of the present disclosure include a computer-implemented method for providing perfect forward secrecy in virtual machines. The computer-implemented method includes receiving, from an application operating within a virtual machine, a secure memory allocation function for a connection secret. The secure memory allocation function includes a memory size parameter. The computer-implemented method further includes allocating memory for the connection secret according to the memory size parameter. The memory includes a memory location and a memory size. The computer-implemented method also includes transmitting the memory location and the memory size to a virtual machine host to be stored as an entry in a secure database and storing the entry in the secure database. The computer-implemented method further includes monitoring an operation state relating to the virtual machine and sanitizing the memory based on a change to the operation state of the virtual machine.

Further embodiments of the present disclosure include a computer program product for providing perfect forward secrecy in virtual machines, which can include a computer-readable storage medium having program instruction embodied therewith, the program instruction executable by a processor to cause the processor to perform a method. The method includes receiving, from an application operating within a virtual machine, a secure memory allocation function for a connection secret. The secure memory allocation function includes a memory size parameter. The method further includes allocating memory for the connection secret according to the memory size parameter. The memory includes a memory location and a memory size. The method also includes transmitting the memory location and the memory size to a virtual machine host to be stored as an entry in a secure database and storing the entry in the secure database. The computer-implemented method further includes monitoring an operation state relating to the virtual machine and sanitizing the memory based on a change to the operation state of the virtual machine.

BRIEF DESCRIPTION OF THE DRAWINGS

These and other features, aspects, and advantages of the embodiments of the disclosure will become better understood with regard to the following description, appended claims, and accompanying drawings where:

Figure 1:
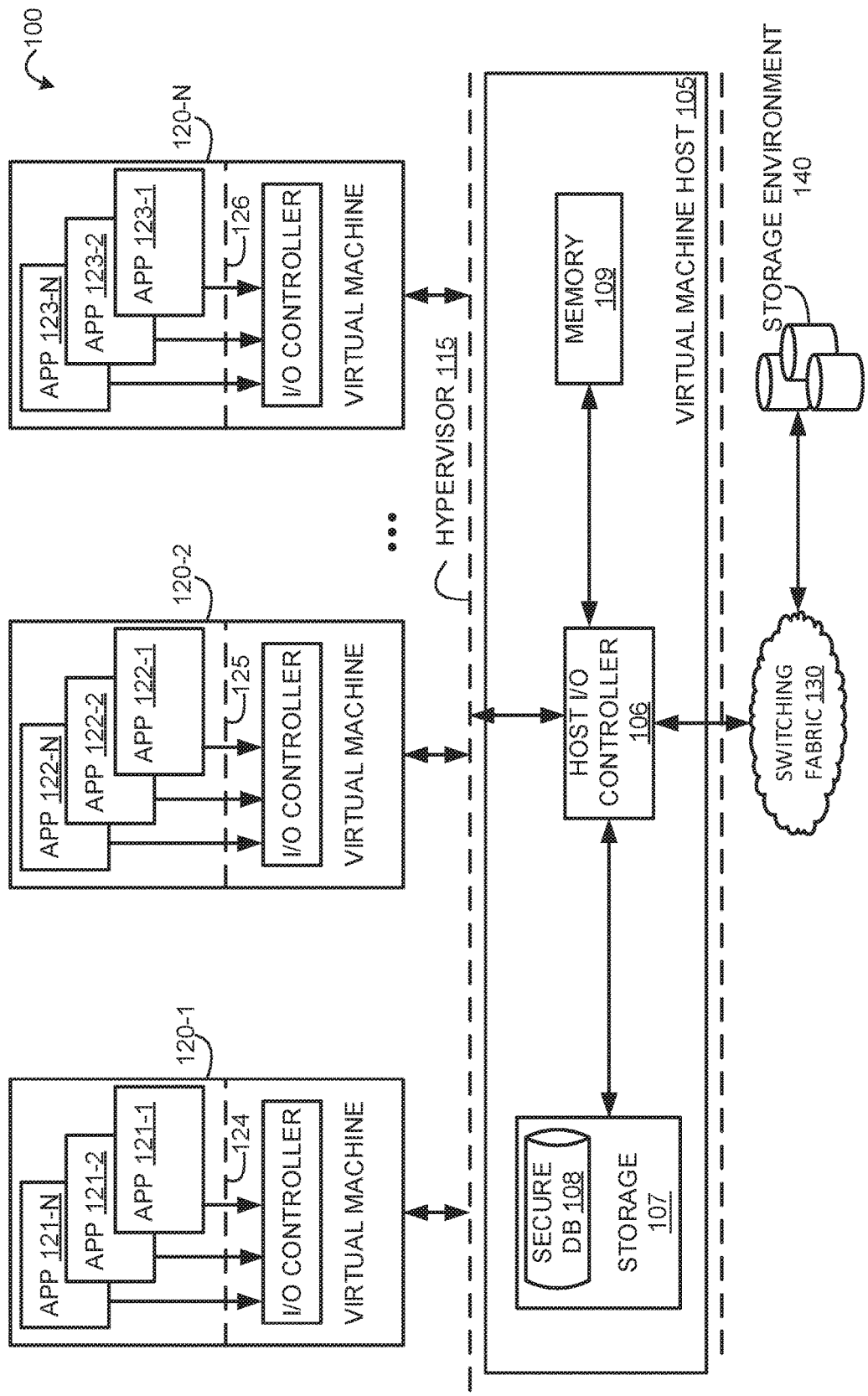
FIG. 1 is a block diagram illustrating an exemplary virtual machine environment, in accordance with embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to virtual machine security, and more specifically, to providing perfect forward secrecy capabilities to virtual machines. While the present disclosure is not necessarily limited to such applications, various aspects of the disclosure may be appreciated through a discussion of various examples using this context.

Perfect forward secrecy is built on a concept known as backtracking resistance. Backtracking resistance refers to a means that assures previously generated bits are impossible to recover. These generated bits can refer to secrets used to establish a secure connection between a server and a client.

Various protocols implement perfect forward secrecy as a way to secure secrets. For instance, the Transport Layer Security (TLS) protocol implements perfect forward security that protects against both data leak and breach style attacks. A data leak refers to an attack where an attacker recovers temporary secrets such as the session keys or Diffie-Hellman private keys. Using these secrets, the attacker can decrypt communication from a present session, but not from any previous or future sessions, because the values used to generate those secrets are different. A breach refers to a model where an attacker recovers long-term secrets. A long-term secret can be a private key corresponding to a public key in a certificate. The long-term secret, however, is not useful in decrypting a previous session as the private key is simply used to authenticate a server.

However, an attacker may be able to compromise a client's machine and gain access to the machine's memory and disk storage. By doing so, the attacker can recover the client's TLS session keys and other secrets stored in memory. Furthermore, if previous keys are still in memory or disk storage, the attacker can locate those secrets and use them to decrypt previous sessions. These types of attacks are protected by perfect forward secrecy. To ensure perfect forward secrecy is maintained, keys should be erased from memory after use and are not to be stored in disk storage.

A virtual machine refers to a virtual representation, or emulation, of a physical computer. To establish a virtual machine, a hypervisor can be used to allocate physical computing resources to the virtual machine. These computing resources include processors, memory, and storage. Once established, a virtual machine can operate as a stand-alone system with its own operating system and applications.

A virtual machine can also be in various states of operation. These include, but are not limited to, running, shutdown, suspended, and checkpoint/snapshot. When a virtual machine is in a running state of operation, instruction execution can be in progress, and an application can reliably delete any keys from memory. When a virtual machine is in a shutdown state, it is forced to shut down. An application may not have an opportunity to delete keys from memory prior to the shutdown. After a virtual machine is shut down, its memory is still being powered on by the virtual machine host. Thus, the memory retains the key information if the virtual machine did not delete it. When a virtual machine is in a suspended state, the hypervisor suspends operation of the virtual machine, and its memory, along with the keys, is written to disk storage. When a virtual machine is in a snapshot state, a snapshot of the virtual machine is taken, similar to a backup, where the memory, along with the keys, is written to storage to support the possibility of revert operations by an administrator.

Limitations on virtual machine security remain, however, as perfect forward secrecy cannot be reliably maintained by a virtual machine due to the various vulnerabilities presented by the states of operation. Applications running within a virtual machine may not be able to securely delete keys from memory or from disk storage. An attacker can compromise the virtual machine and access the memory and disk storage to retrieve the keys as well as other secrets.

Embodiments of the present disclosure may overcome the above and other problems, by using a perfect forward secrecy system. The perfect forward secrecy system includes a secure memory allocation function configured to allocate a connection secret into memory and store information regarding the connection secret in an encrypted database. The perfect forward secrecy system further includes a secure memory deallocation function configured to deallocate the connection secret from memory and perform a sanitization operation on the memory location where the connection secret was stored. The perfect forward secrecy system also includes a secure memory reallocation function configured to reallocate the memory into a different memory location and to update the encrypted database with that corresponding information. Additionally, the perfect forward system includes a virtual machine monitor configured to monitor the virtual machines which have utilized the secure memory allocation functions. Upon receiving a change in the operational status of a monitored virtual machine, the perfect forward system can sanitize memory locations as necessary.

More specifically, the perfect forward secrecy system described herein provides applications operating within a virtual machine, or a physical machine, with secure memory allocation functions for connection secrets. The connection secrets include, but are not limited to, public keys, private keys, and session keys. The perfect forward secrecy system can monitor the status of the virtual machines to determine whether or not the sanitization of a memory location is required.

Memory allocation functions are functions used by applications to perform dynamic memory allocation. Dynamic memory allocation refers to the process of allocating memory during program execution. The types of memory allocation functions include, but are not limited to, malloc, calloc, realloc, and free. The malloc function allocates memory of the requested size and returns a pointer to the first byte of allocated space. The calloc function, similar to the malloc function, also allocates the space for elements of an array. It also initializes the elements to zero and returns a pointer to the first byte of allocated space. The realloc function is used to modify the size of a previously allocated memory space. The free function empties a previously allocated memory space.

The perfect forward secrecy system provides secure memory allocation functions that can be used by applications to perform dynamic memory allocation for connection secrets. The secure memory allocation functions include smalloc, scalloc, srealloc, and sfree.

In some embodiments, the smalloc function is a secure memory allocation used to allocate a block of memory dynamically. An application operating on a virtual machine can use the smalloc function to allocate a secure memory of a size requested by the function. The virtual machine can allocate the memory the same as it would with the malloc function. Once allocated, the virtual machine can notify the virtual machine host, via a hypervisor, of the memory location by providing the pointer generated during allocation as well as the size of the secure memory. The virtual machine host can store the pointer information and the size of the secure memory in a secure database.

In some embodiments, the scalloc function is secure memory allocation function used to allocate multiple blocks of memory dynamically. An application operating on a virtual machine can use the scalloc function to allocate based on n number of memory blocks of the same size. The virtual machine can allocate the memory the same as it would with the calloc function. After the memory space is allocated, the bytes can be initialized to zero. Once allocated, the virtual machine can notify the virtual machine host, via a hypervisor, of the memory location by providing the pointer generated during allocation as well as the size of the secure memory. The virtual machine host can store the pointer information and the size of the secure memory in a secure database. Typically, a scalloc function can be used to allocate memory for complex data structures such as arrays and structures.

In some embodiments, the srealloc function is a secure memory allocation function used to resize the memory size of already allocated memory. It can expand the current memory block size while leaving the original content as it is. An application operating on a virtual machine can use the srealloc function to reallocate secure memory and specify the new memory size. The virtual machine can allocate the memory the same as it would with the realloc function. The virtual machine can notify the virtual machine host, via the hypervisor, of the location and size of the secure memory. Using that information, the virtual machine host can update the entry in the secure database to reflect the new information.

In some embodiments, the sfree function is used to release/deallocate secure memory. An application operating on a virtual machine can use the sfree function to delete secure memory. The virtual machine can notify the virtual machine host, via the hypervisor, about the location and size of the secure memory being freed. The virtual machine can delete the memory and sanitize the location. The entry in the secure database can also be deleted.

Referring now to FIG. 1, shown is a block diagram illustrating an exemplary virtual machine environment 100, in accordance with embodiments of the present disclosure. The virtual machine environment 100 includes a virtual machine host 105, a hypervisor 115, virtual machine 120-1, 120-2, 120-N (collectively "virtual machines 120"), where N is a variable integer representing any number of possible virtual machines 120, a switching fabric 130, and a storage environment 140.

The virtual machine 120-1 includes applications 121-1, 121-2, 121-N (collectively "applications 121"), and a guest operating system 124. The virtual machine 120-2 includes applications 122-1, 122-2, 122-N (collectively "applications 122"), and a guest operating system 125. The virtual machine 120-3 includes applications 123-1, 123-2, 123-N (collectively "applications 123"), and a guest operating system 126. The virtual machine host 105 includes a host input/output (I/O) controller 106, storage 107, including a secure database 108, and memory 109.

The virtual machine host 105 is a component of the virtual machine environment 100 configured to provide and support virtualization, in accordance with embodiments of the present disclosure. The virtual machine host 105 is further configured to operate the hypervisor 115. Virtualization refers to the process of running a virtual instance of a computer system in a layer abstracted from the actual hardware. The virtual machine host 105 can be a physical computer, server, physical machine, and the like, with physical computing components. The physical computing components include, but are not limited to, at least one processor, storage 107, and memory 109. The virtual machine host 105 can also operate the hypervisor 115 to provide the virtualization needed to generate the virtual machines 120.

The hypervisor 115, or virtual machine monitor (VMM), is a component of the virtual machine environment 100 configured to create and deploy the virtual machines 120, in accordance with embodiments of the present disclosure. The hypervisor 115 can be computer software, firmware, or hardware that provides the environment in which the virtual machines 120 operate within. The hypervisor 115 can also manage the execution of the virtual machines' 120 operating systems. The hypervisor 115 acts as an interface between the hardware devices (e.g., storage 107, memory 109) on the virtual machine host 105 and the virtual devices on the virtual machines 120. The hypervisor 115 presents some subset of the physical resources to each individual virtual machine 120 and handles the actual I/O from the virtual machine 120 to a physical device and back again. For example, application 121-1 requests an allocation of a variable onto the memory of virtual machine 120-1. The virtual machine 120-1 allocates the variable into its virtual memory space provided by the hypervisor 115, and the hypervisor 115 can allocate the variable into physical memory 109.

The virtual machines 120 are components of the virtual machine environment 100 configured to operate as containers for operating systems and applications that run on top of the hypervisor 115 on the virtual machine host 105. The virtual machines 120 can include a set of resources to which the applications 121, 122, 123 running on the virtual machines 120 can request access. An application can request usage of the resources available to a virtual machine 120 through programming language functions (e.g., malloc, calloc, free, realloc), which get passed through to the operating system 124, which passes the request to a virtual I/O controller. The virtual I/O controller can process the request by accessing the virtual resources assigned to the virtual machine 120. Upon accessing the virtual resources, the hypervisor 115 can access the host I/O controller 106 to perform the functions on the physical resources located on the virtual machine host 105.

The switching fabric 130 is a component of the virtual machine environment 100 configured to interconnect the virtual machine host 105 and the storage system 140 via one or more network switches, in accordance with embodiments of the present disclosure. The switching fabric 130 can be made up of a variety of high-speed networks. These networks include but are not limited to, fiber channel, Inifini-Band, and RapidIO. The switching fabric 130 can be a combination of hardware and software that controls traffic to and from a network node with the use of multiple switches. Typically, the switching fabric 130 makes use of shared memory and data buffers. In some embodiments, the switching fabric 130 is a fiber channel switched fabric (FC-SW) topology where devices in the network (e.g., the virtual machine host 105) can be connected to each other via one or more fiber channel switches.

The storage environment 140 is a component of the virtual machine environment configured to consolidate, manage, and operate data storage, in accordance with embodiments of the present disclosure. In some embodiments, the storage environment 140 is a server or an aggregation of servers. Examples of the storage environment 140 include storage servers (e.g., block-based storage), direct-attached storage, file servers, server-attached storage, network-attached storage, or any other storage solution. In some embodiments, the components of the storage environment 140 are implemented within a single device. In some other embodiments, the components of the storage environment 140 comprise a distributed architecture. For example, the storage environment 140 can comprise multiple storage systems physically located at different locations but are able to communicate over a communication network to achieve the desired result.

In some embodiments, the storage environment 140 is a storage area network (SAN). SANs can include a multitude of storage systems of varying capabilities. These storage systems can have capabilities such as data reduction (e.g., deduplication, compression), storage tiering, redundant array of independent disks (RAID), and the like. Other storage systems may simply store fully allocated volumes.

It is noted that FIG. 1 is intended to depict the major representative components of an exemplary virtual machine environment 100. In some embodiments, however, individual components may have greater or less complexity than as represented in FIG. 1, components other than or in addition to those shown in FIG. 1 may be present, and the number, type, and configuration of such components may vary.

Figure 2:
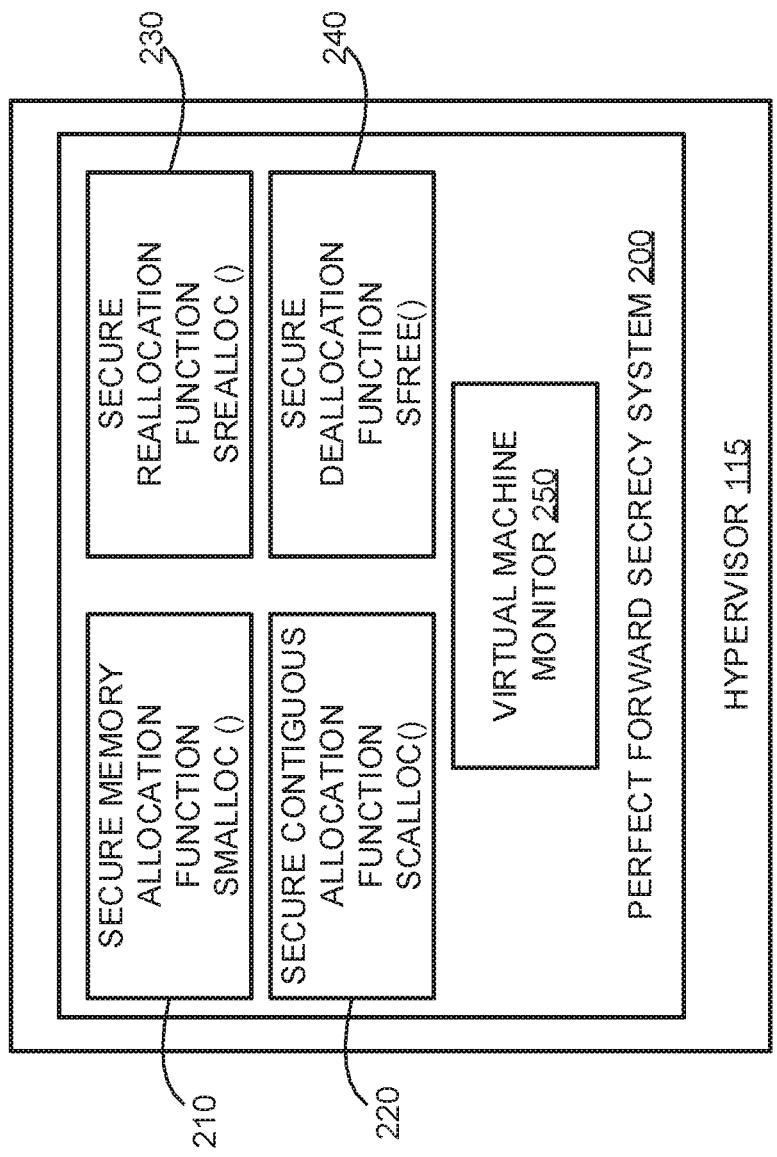
FIG. 2 is a block diagram illustrating a perfect forward secrecy system, in accordance with embodiments of the present disclosure.

FIG. 2 is a block diagram illustrating a perfect forward secrecy system 200 operating within a hypervisor 115, in accordance with embodiments of the present disclosure. The perfect forward secrecy system 200 includes a secure memory allocation function 210, a secure contiguous allocation function 220, a secure reallocation function 230, a secure deallocation function 240, and a virtual machine monitor 250.

The secure memory allocation function 210 is a component of the perfect forward secrecy system 200 configured to allocate secure memory. The secure memory allocation function 210 (smalloc 210) can be used to allocate a block of memory on a heap. A user can specify the number of bytes to be allocated when the function is used. Once allocated, an application can access the block of memory via a pointer that is returned by the secure memory allocation function 210. The pointer returned by smalloc 210 can be a void type and castable by the application 121 into a data type (e.g., connection secret).

The secure memory allocation function 210 is further configured to transmit attributes of the memory allocated using this function. These attributes include, but are not limited to, the pointer that references the location of the memory as well as the memory size allocated. The attributes can be transmitted, via the hypervisor 115, to a virtual machine host 105 where entry of the attributes can be made into a secure database 108.

In some embodiments, the smalloc 210 is used by an application operating on a physical machine. The smalloc 210 can allocate the memory in the same manner as a virtual machine. The attributes of the allocation and memory size can be performed by the physical machine that can be kept separate and inaccessible by the application.

In some embodiments, the virtual machine host 105 can operate the secure database 108 within a storage environment 140. For example, the virtual machine host 105 may access a SAN storage drive that is storing the secure database 108.

The secure contiguous allocation function 220 is a component of the perfect forward secrecy system 200 configured to allocate multiple blocks of memory. The secure contiguous allocation function 220 (scalloc 220) can be used to allocate memory for complex data structures such as an array or linked list. The multiple blocks of memory are of the same size as specified when the function is used. Once allocated, an application can access the block of memory via a pointer that is returned by the secure contiguous allocation function 220. The pointer returned by scalloc 220 can be a void type and castable by the application into a data type (e.g., connection secret).

The secure contiguous allocation function 220 is further configured to transmit attributes of the memory allocated using this function. These attributes include, but are not limited to, the pointer that references the location of the memory as well as the memory size allocated. The attributes can be transmitted, via the hypervisor 115, to a virtual machine host 105 where entry of the attributes can be made into a secure database 108.

In some embodiments, the scalloc 220 is used by an application operating on a physical machine. The scalloc 220 can allocate the memory in the same manner as a virtual machine. The attributes of the allocation and memory size can be performed by the physical machine that can be kept separate and inaccessible by the application.

The secure reallocation function 230 is a component of the perfect forward secrecy system 200 configured to alter the memory size of an already allocated memory secured by either the smalloc 210 or the scalloc 220. The secure reallocation function 230 (srealloc 230) can expand the current block or blocks of memory while not affecting the stored content. The srealloc 230 can also reduce the memory size of the previously allocated memory size. For example, an application can initially call smalloc 210 to allocate four hundred bytes of memory. The srealloc 230 can be called to reduce the memory size to a different size, such as two hundred bytes. In this same example, the original four hundred bytes can be sanitized using known sanitization techniques.

The secure reallocation function 230 is further configured to transmit updated attributes of the memory reallocated using this function. The attributes include the pointer that references the location of the memory as well as the resized memory size. The attributes can be transmitted, via the hypervisor 115, to a virtual machine host 105 where the entry previously inputted by the smalloc 210 or the scalloc 220 can be updated with the updated attributes.

The secure deallocation function 240 is a component of the perfect forward secrecy system 200 configured to deallocate the memory blocks allocated by the smalloc 210 or the scalloc 220 functions. The secure deallocation function 240 (sfree 240) can release the memory allocated by either the smalloc 210 or the scalloc 220 and sanitize the memory blocks by overwriting the blocks with random values. In some embodiments, the sfree 240 overwrites the memory blocks using known sanitization techniques.

The sfree 240 is further configured to transmit a function notifying a virtual machine host 105 that the memory blocks have been released and to delete any entry of that allocation from the secure database 108. Additionally, the function can instruct the virtual machine host 105 to sanitize the physical memory location that stored the allocated memory blocks.

The virtual machine monitor 250 is a component of the perfect forward secrecy system 200 configured to monitor operation states of virtual machines 120 that have used the secure memory allocation functions (e.g., smalloc 210, scalloc 220, srealloc 230, sfree 240). Upon detecting a change in the operation state of a virtual machine 120, the virtual machine monitor 250 can initiate actions to ensure perfect forward secrecy is maintained. These operation states include, but are not limited to, running, shutdown, suspended, and checkpoint/snapshot.

A virtual machine 120 can be in a running operation state by sending a notification to the hypervisor 115 notifying the virtual machine host 120 that operation has started. At this point, the virtual machine 120 can execute instruction from its guest operating system 124 and any applications 121 operating on the virtual machine 120. During this operation state, the virtual machine monitor 250 can monitor for any change from this operation state. The virtual machine 120 in a running operation state can reliably delete and sanitize ephemeral and session keys stored using the secure memory allocation functions. For example, an application can call smalloc 210 to allocate memory blocks for a session key. Once the session key is no longer needed, the application can call the sfree 240 function to delete and sanitize the memory blocks storing the key. The virtual machine monitor 250 need not perform any additional actions as long as the virtual machine 120 stays in the running operation state when those two functions are called.

A virtual machine 120 can be in a shutdown operation state when it has stopped operation. This can occur in several ways. For instance, the virtual machine 120 can initiate a shutdown itself and notify the hypervisor 115 that a shutdown is occurring. Also, a virtual machine 120 can be shutdown due to a stop or kill action initiated by the hypervisor 115. The virtual machine monitor 250 can also detect that a virtual machine 120 is no longer running and determine that the virtual machine 120 is in a shutdown operation state.

The virtual machine monitor 250 is further configured to sanitize secure memory blocks allocated by a virtual machine 120 that is in a shutdown operation state. Upon detecting that a virtual machine 120 is in a shutdown operation state, the virtual machine monitor 250 can send a function to the virtual machine host 105 to retrieve all entries in the secure database 108 that were made by the virtual machine 120. The memory blocks referenced in the entries can be sanitized. Once sanitized, the entries can be removed from the secure database 108. In some embodiments, the virtual machine monitor 250 sends a function to the virtual machine host 105 to sanitize all memory blocks held by the virtual machine 120 if the virtual machine 120 had an entry in the secure database 108.

A virtual machine 120 can be in a suspended operation state when a suspend function is issued to a virtual machine 120. A suspend function can be issued by a hypervisor 115 as well as from a file executed by the virtual machine 120. Once initiated, all transactions being performed by the virtual machine 120 are frozen until a resume function is issued. When a virtual machine 120 is suspended, its memory can be written onto storage so as to preserve the virtual machine 120 until a resume function is issued. However, if the virtual machine 120 has connection secrets allocated onto memory, those connection secrets are written to storage.

The virtual machine monitor 250 is further configured to sanitize the storage location of the secure memory blocks allocated by a virtual machine 120 that is in a suspended operation state. Upon detecting a virtual machine 120 in a suspended operation state, the virtual machine monitor 250 can send a function to the virtual machine host 105 to sanitize the stored memory locations that have been written onto storage. For example, a virtual machine 120 can use a secure memory allocation function (e.g., smalloc 210, scalloc 220) to store a connection secret in memory. While the connection secret is still stored in memory, the virtual machine 120 can go into a suspended operation state that triggers the virtual machine host 105 to store the memory of the virtual machine 120 on storage 107. The virtual machine monitor 250 can send a function to the virtual machine host 105 to delete and sanitize the connection secret from storage.

In some embodiments, the virtual machine monitor 250 sends a function to the virtual machine host 105 to retrieve all entries in the secure database 108 that were made by the virtual machine 120 and to sanitize the memory blocks referenced in those entries. Once sanitized, the entries can be removed from the secure database 108. This can be performed prior to the virtual machine host 105 writing the memory onto storage. Thus, any secure memory blocks allocated by the virtual machine 120 are deleted prior to the memory being written to storage.

A virtual machine 120 can be in a checkpoint/snapshot operation state where an image of the virtual machine 120 is taken and written onto storage 107. This typically occurs for back up purposes and to support possible revert operation functions. Similar to the suspend operation state, the virtual machine's 120 memory can be written onto storage so as to preserve the virtual machine 120. However, if the virtual machine 120 has connection secrets allocated onto memory, those connection secrets are written to storage.

The virtual machine monitor 250 is further configured to send a function to the virtual machine host 105 to retrieve entries made into the secure database 108 by a virtual machine 120 going into a checkpoint/snapshot operation state. Using the information stored in the secure database 108, the virtual machine host 105 can sanitize the memory blocks prior to storing an image of the virtual machine 120.

In some embodiments, the perfect forward secrecy system 200 operates with any memory allocation function provided by a virtual machine 120. For example, the operating system calls corresponding to a new function or delete function that operates similar to an allocation and deallocation function can be used by the perfect forward secrecy system 200.

In some embodiments, the perfect forward secrecy system 200 operates using a third-party shared library system calls offered by a virtual machine provider. For example, in place of operating system calls allocating the memory. Virtual machines 120 operating within a particular platform can utilize the shared library that offers functionality similar to that of smalloc 210, scalloc 220, srealloc 230, and sfree 240.

Figure 3:
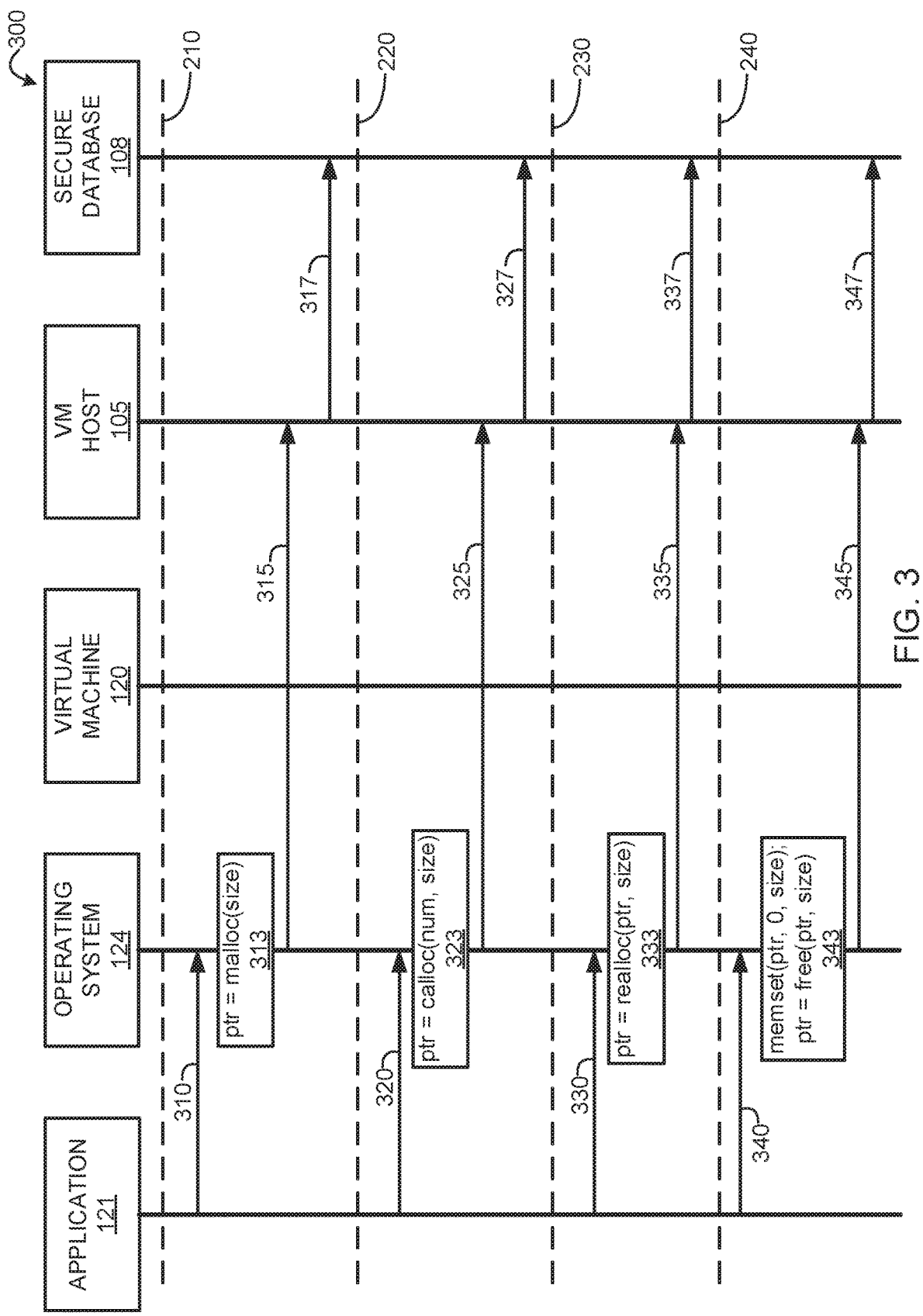
FIG. 3 is a data flow diagram illustrating secure system calls invoked by an application, in accordance with embodiments of the present disclosure.

FIG. 3 is a data flow diagram 300 illustrating secure memory allocation functions according to the perfect forward secrecy system 200, in accordance with embodiments of the present disclosure. To illustrate data flow diagram 300, but not to limit embodiments, FIG. 3 is described within the context of the virtual machine environment 100 of FIG. 1 and the perfect forward secrecy system 200 of FIG. 2.

At operation 310, the application 121 can transmit a smalloc 210 function to a guest operating system 124. The smalloc 210 function includes a memory size to be allocated securely. At operation 313, the guest operating system 124 can allocate the memory in the same manner as a malloc function. The memory is allocated in the virtual machine's 120 virtual memory space corresponding to physical memory space operated by the virtual machine host 105.

At operation 315, the perfect forward secrecy system 200 can send a function to the virtual machine host 105 to add an entry into a secure database 105. The function can include the pointer generated by the malloc function and the memory size requested. At operation 317, the virtual machine host 105 can create an entry into the secure database 108 that includes the location and the memory size of the allocated memory.

At operation 320, the application 121 can transmit a scalloc 220 function to a guest operating system 124. The scalloc 220 function includes a number of blocks to be allocated and a memory size for each block. At operation 323, the guest operating system 124 can allocate the memory in the same manner as a calloc function. The memory is allocated in the virtual machine's 120 virtual memory space corresponding to physical memory space operated by the virtual machine host 105.

At operation 325, the perfect forward secrecy system 200 can send a function to the virtual machine host 105 to add an entry into a secure database 108. The function can include the pointer generated by the calloc function and the memory size requested. At operation 327, the virtual machine host 105 can create an entry into the secure database 108 that includes the location and the memory size of the allocated memory.

At operation 330, the application 121 can transmit a srealloc 230 function to a guest operating system 124. The srealloc 230 function includes a pointer indicating a location of allocated memory and a new memory size. At operation 333, the guest operating system 124 can reallocate the memory in the same manner as a realloc function. The memory is reallocated in the virtual machine's 120 virtual memory space corresponding to physical memory space operated by the virtual machine host 105.

At operation 335, the perfect forward secrecy system 200 can send a function to the virtual machine host 105 to modify an entry in a secure database 108. The function can include the pointer generated by the realloc function, the old memory pointer, and the updated memory size. At operation 337, the virtual machine host 105 can update the entry into the secure database 108 that includes the location and the updated memory size of the reallocated memory and additionally can sanitize the physical memory location that corresponded to the old memory.

At operation 340, the application 121 can transmit a sfree 240 function to a guest operating system 124. The sfree 240 function includes a location and memory size to be deallocated securely. At operation 343, the guest operating system 124 can deallocate the memory in the same manner as a free function. The memory is deallocated in the virtual machine's 120 virtual memory space corresponding to physical memory space operated by the virtual machine host 105. Additionally, the guest operating system 124 can populate the memory space with zero's to overwrite any information that was stored in that space.

At operation 345, the perfect forward secrecy system 200 can send a function to the virtual machine host 105 to delete an entry in a secure database 105. The function can include a point providing a location of the memory and the memory size deallocated. At operation 317, the virtual machine host 105 can delete an entry from the secure database 108 that includes the location and the memory size of the allocated memory. Additionally, the virtual machine host 105 can sanitize the physical memory location that corresponded to the location in the sfree 240 function.

Figure 4:
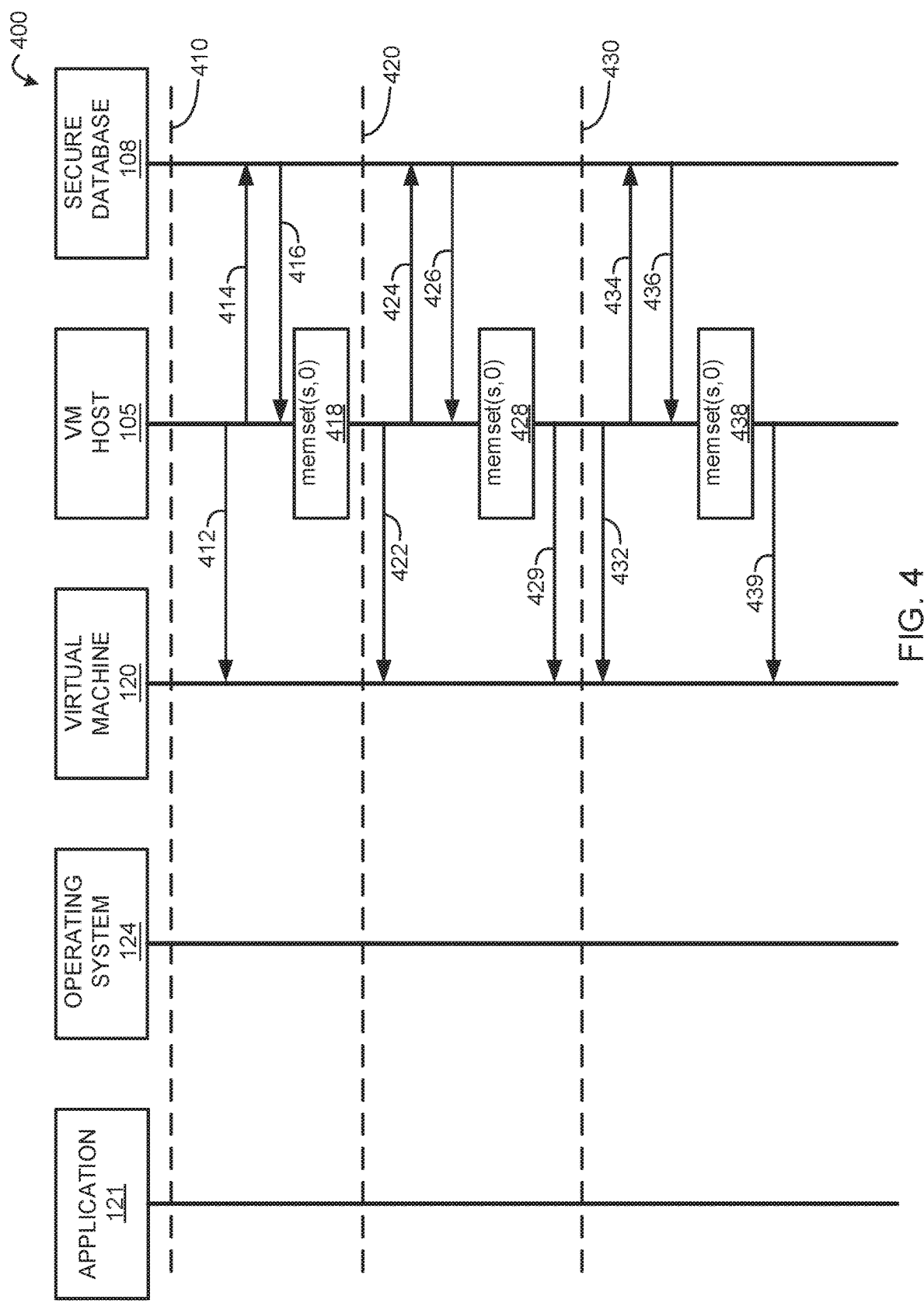
FIG. 4 is a data flow diagram illustrating a sequence of events based on virtual machine operation states, in accordance with embodiments of the present disclosure.

FIG. 4 is a data flow diagram 400 illustrating virtual machine operation states according to the perfect forward secrecy system 200, in accordance with embodiments of the present disclosure. To illustrate data flow diagram 400, but not to limit embodiments, FIG. 4 is described within the context of the virtual machine environment 100 of FIG. 1 and the perfect forward secrecy system 200 of FIG. 2.

At operation 412, the virtual machine host 105 issues a power-off function to the virtual machine 120. This places the virtual machine 120 in a shutdown operation state 410. The virtual machine monitor 250 can notice that the virtual machine 120 is now in a shutdown state and can send a function to the virtual machine host 105 to retrieve all entries made by the virtual machine 120 that is being stored in the secure database 108.

At operation 414, the virtual machine host 105 retrieves the entries stored in the secure database 108 that were made by the virtual machine 105. At operation 416, the secure database 108 responds to the query request and transmits the information for any and all entries made by the virtual machine 120.

At operation 418, the virtual machine host 105 can overwrite the memory locations found in each of the entries provided by the secure database 108. Additionally, the virtual machine host 105 can sanitize the memory locations using known sanitization techniques to permanently delete any connection secrets stored in those memory locations.

At operation 422, the virtual machine host 105 issues a suspend function to the virtual machine 120 to pause all operations being performed. This places the virtual machine 120 in a suspended operation state 420. The virtual machine monitor 250 can notice that the virtual machine 120 is now in a suspended state and can send a function to the virtual machine host 105 to retrieve all entries made by the virtual machine 120 that is being stored in the secure database 108.

At operation 424, the virtual machine host 105 retrieves the entries stored in the secure database 108 that were made by the virtual machine 105. At operation 426, the secure database 108 responds to the query request and transmits the information for any and all entries made by the virtual machine 120.

At operation 428, the virtual machine host 105 can overwrite the memory locations found in each of the entries provided by the secure database 108. Additionally, the virtual machine host 105 can sanitize the memory locations using known sanitization techniques to permanently delete any connection secrets stored in those memory locations.

At operation 429, the virtual machine host 105 can complete the suspension of the virtual machine 120 to halt all operations. Additionally, the virtual machine 105 can store the memory of the virtual machine 120 in storage 107.

At operation 432, the virtual machine host 105 issues a checkpoint/snapshot function to the virtual machine 120 to create an image of the virtual machine 120. This places the virtual machine 120 in a checkpoint/snapshot operation state 430. The virtual machine monitor 250 can notice that the virtual machine 120 is now in a checkpoint/snapshot state and can send a function to the virtual machine host 105 to retrieve all entries made by the virtual machine 120 that is being stored in the secure database 108.

At operation 434, the virtual machine host 105 retrieves the entries stored in the secure database 108 that were made by the virtual machine 105. At operation 436, the secure database 108 responds to the query request and transmits the information for any and all entries made by the virtual machine 120.

At operation 438, the virtual machine host 105 can overwrite the memory locations found in each of the entries provided by the secure database 108. Additionally, the virtual machine host 105 can sanitize the memory locations using known sanitization techniques to permanently delete any connection secrets stored in those memory locations.

At operation 439, the virtual machine host 105 can complete the checkpoint/snapshot of the virtual machine 120 by taking an image of the virtual machine 105. The image of the virtual machine 105 can be stored in storage 107 as a backup of the virtual machine 105.

Figure 5:
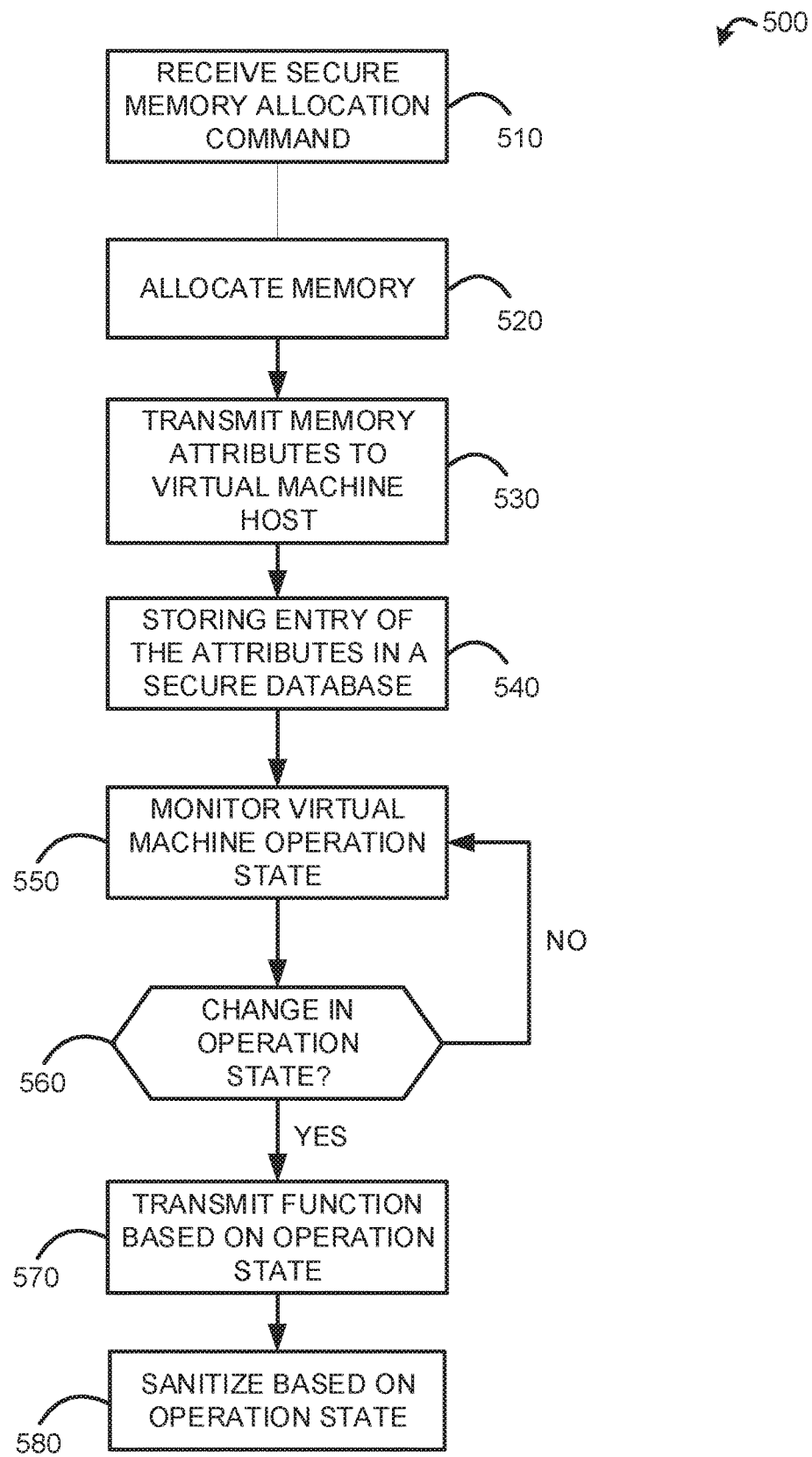
FIG. 5 is a flow chart of a secure memory allocation process, in accordance with embodiments of the present disclosure.

FIG. 5 is a flow diagram illustrating a process 500 for providing perfect forward secrecy for a virtual machine, in accordance with embodiments of the present disclosure. The process 500 may be performed by hardware, firmware, software executing on at least one processor, or any combination thereof. For example, any or all of the steps of the process 500 may be performed by one or more computing devices (e.g., computer system 600 of FIG. 6). To illustrate process 500, but not to limit embodiments, FIG. 5 is described within the context of the virtual machine environment 100 of FIG. 1 and the perfect forward secrecy system 200 of FIG. 2.

The process 500 begins by receiving a secure memory allocation function from a virtual machine 120 to store a connection secret. This is illustrated at step 510. The secure memory allocation functions can be a smalloc 210, a scalloc 220, and a srealloc 230. Depending on the secure memory allocation function, various parameters may be included. For example, a smalloc function includes a memory size parameter indicating the memory size that is to be allocated. A scalloc function includes a memory size and a number of blocks to be allocated. The memory size indicates the memory size of each block being allocated. A srealloc function includes a pointer to a memory location being resized and a memory size of the new memory size.

The virtual machine 120 allocates the memory requested by the secure memory allocation function. This is illustrated at step 520. A virtual machine 120 can allocate the memory as a standard memory allocation function. For example, a smalloc 210 function can be allocated in a similar way as a malloc function. A scalloc 220 function can be allocated in a similar way as a calloc function, and a srealloc 230 function can be allocated in a similar way as a realloc function.

Once allocated, the perfect forward secrecy system 200 transmits memory attributes relating to secure memory allocation function to the virtual machine host 105. This is illustrated at step 530. The memory attributes include the memory location of the allocated memory and the memory size allocated. Based on the secure memory allocation function received, the memory attributes transmitted to the virtual machine host 105 may vary. For instance, a smalloc 210 function can have the memory location and a memory size transmitted. A srealloc 230 function can have a memory location of a currently stored memory location and an updated memory size. In some embodiments, a pointer, providing the memory location, is transmitted as a memory attribute.

The virtual machine host 105 stores an entry into a secure database 108 that includes the memory attributes and the virtual machine 120. This is illustrated at step 540. The entry can include the memory location, the memory size of the allocated memory, and information regarding the virtual machine 120 that made the allocation. The entry can be used in deleting and sanitizing connection secrets in the event that the virtual machine 120 changes to an operation state that could compromise the connection secrets. In some embodiments, the virtual machine host 105 stores the entry into the secure database 108 that is stored in a storage environment 140. For example, the secure database 108 can be stored in a SAN accessible to the virtual machine host 105.

The virtual machine monitor 250 monitors the virtual machine 120 for a change in its operation state. This is illustrated at step 550. The virtual machine monitor 250 can identify which virtual machines 120 have allocated memory using secure memory functions and monitor to see if their operation state has changed. In some embodiments, the virtual machine monitor 250 can query the virtual machine 120 at an interval to determine the operation state. For example, the virtual machine monitor 250 can ping the virtual machine 120 to see if a response is given. A query can also be sent to the virtual machine host 105 to provide a status on the virtual machine 120. In some embodiments, the virtual machine monitor 250 receives a notification from the virtual machine host 105 that a virtual machine 120 is changing operation state. For example, a virtual machine host 105 can transmit a stop function, or a suspend function, to a virtual machine 120. When doing so, the virtual machine host 105 can also transmit a message to the virtual machine monitor 250, notifying it of the upcoming change.

The virtual machine monitor 250 determines whether there is an operation change to the virtual machine 120. This is illustrated at step 560. If no change has occurred, the virtual machine monitor 250 continues to monitor the virtual machine 120 until the virtual machine 120 securely deallocates the memory. However, if the virtual machine monitor 250 notices that an operation change has occurred to the virtual machine 120, then the virtual machine monitor 250 determines the operation state the virtual machine 120 changed to. This is illustrated at step 570. For example, the virtual machine 120 can change from a running state to a shutdown state, or to a suspended state, or to a checkpoint/snapshot state. Based on the state the virtual machine 120 changed to, the virtual machine monitor 250 can provide functions to the virtual machine host 105 to prevent connection secrets from being compromised.

The virtual machine host 105 sanitizes the memory location allocated by the virtual machine. This is illustrated at step 580. The virtual machine host 105 can query the secure database 108 for all entries made by the virtual machine 120. Upon retrieving the query results, the virtual machine host 105 can read each entry to determine the secure memory location allocated by the virtual machine 120. At each memory location, the virtual machine host 105 can overwrite the data with zeros. In some embodiments, the virtual machine host 105 permanently erases data from the physical memory locations using known sanitization techniques.

In some embodiments, the virtual machine host 105 permanently erases data stored on the storage 107. The virtual machine host 105 can determine if the memory stored by the virtual machine 120 has been saved onto storage prior to permanently deleting the secure memory locations. For example, a suspend operation or a snapshot/checkpoint operation copy the memory of a virtual machine 120 and place the copy onto storage. If the memory has been stored onto storage, then the virtual machine host 105 can go into storage 107 and locate the stored memory and permanently erase the data.

Figure 6:
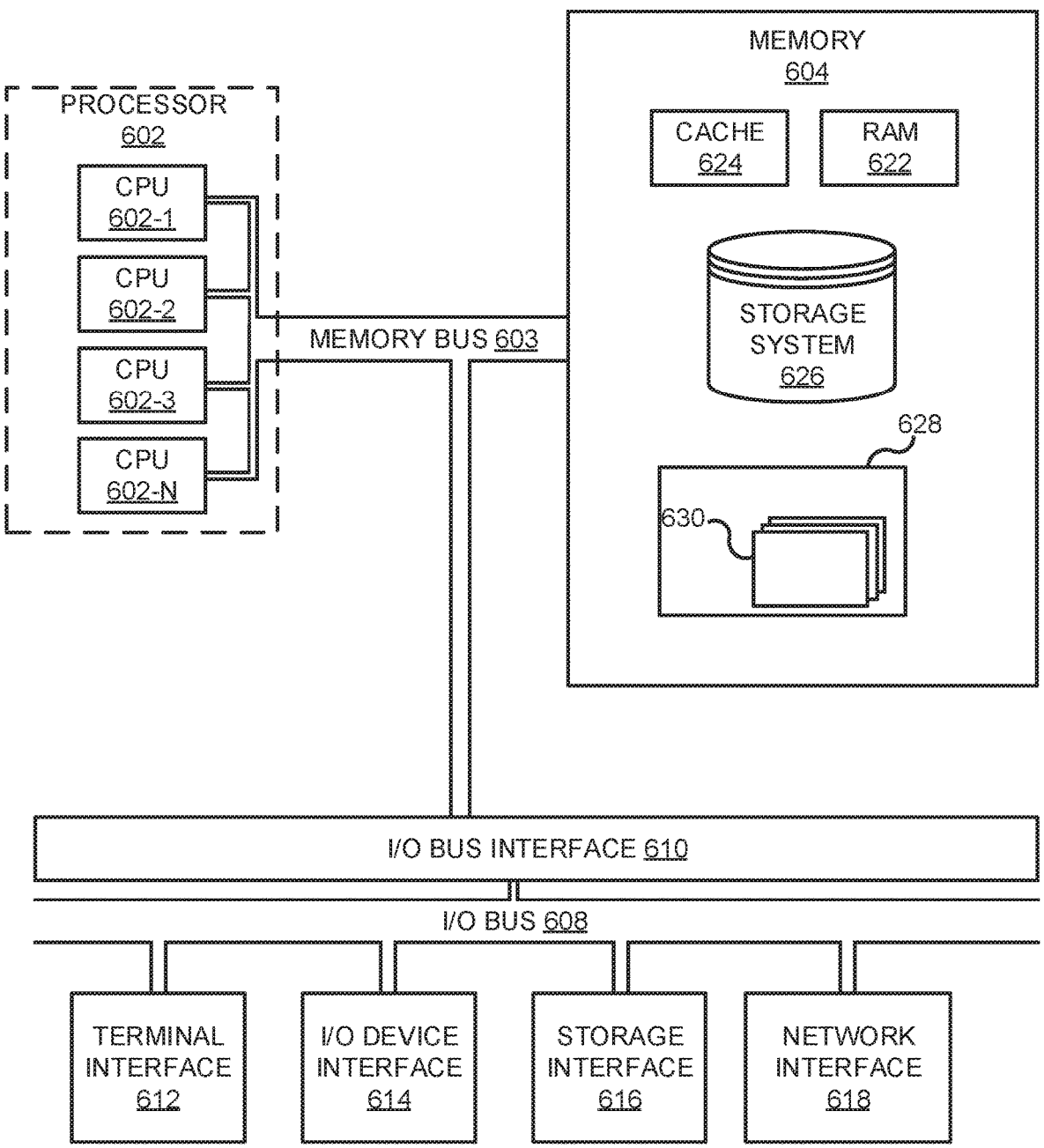
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 600 (e.g., the perfect forward secrecy system 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 600 may comprise one or more processors 602, a memory 604, a terminal interface 612, a I/O (Input/Output) device interface 614, a storage interface 616, and a network interface 618, all of which may be communicatively coupled, directly or indirectly, for inter-component communication via a memory bus 603, a I/O bus 608, and an I/O bus interface 610.

The computer system 600 may contain one or more general-purpose programmable central processing units (CPUs) 602-1, 602-2, 602-3, and 602-N, herein generically referred to as the processor 602. In some embodiments, the computer system 600 may contain multiple processors typical of a relatively large system; however, in other embodiments, the computer system 600 may alternatively be a single CPU system. Each processor 601 may execute instructions stored in the memory 604 and may include one or more levels of on-board cache.

The memory 604 may include computer system readable media in the form of volatile memory, such as random-access memory (RAM) 622 or cache memory 624. Computer system 600 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the processors 602, the memory 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interface units, multiple I/O buses, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the major representative components of an exemplary computer system 600. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 7:
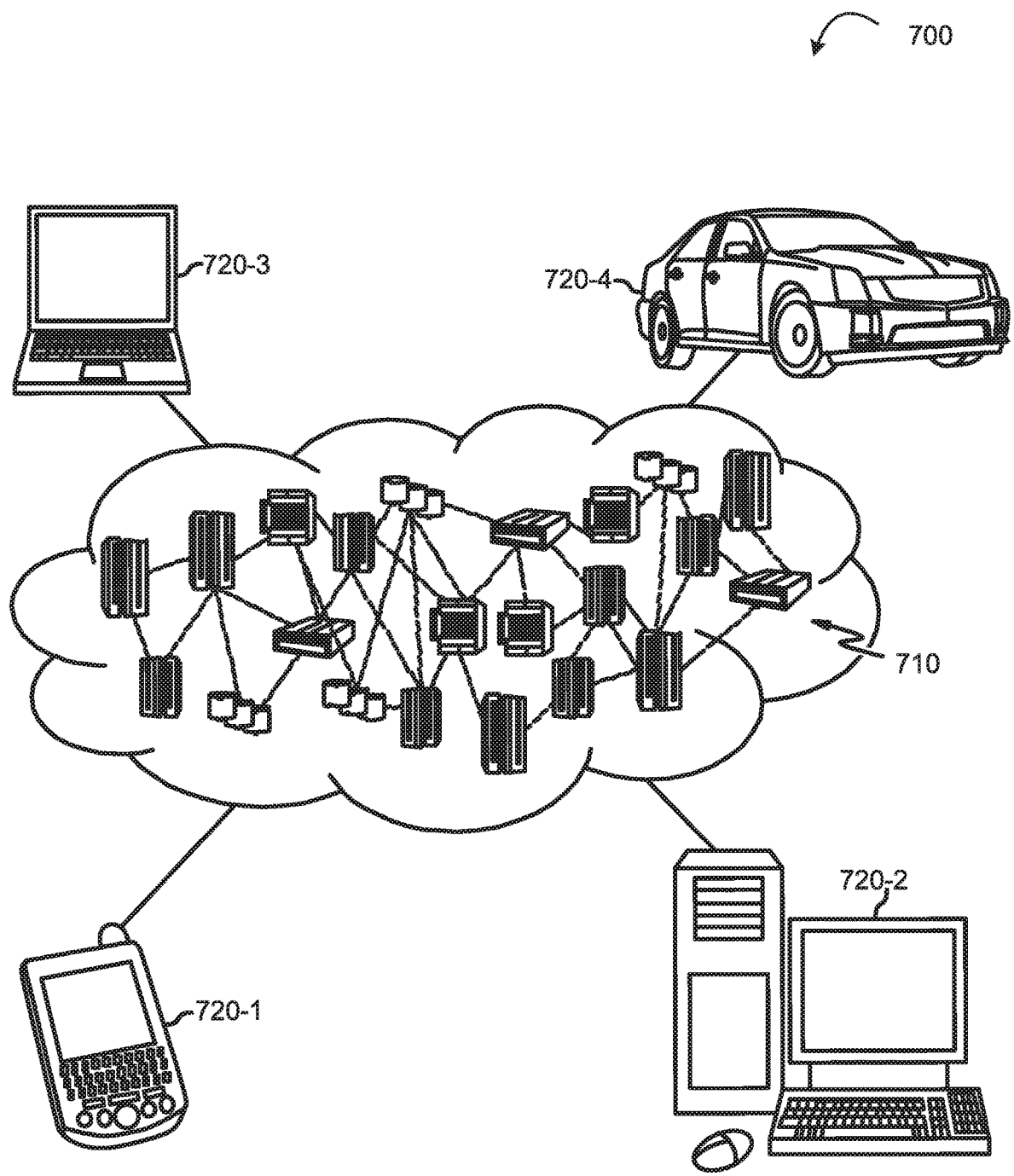
FIG. 7 depicts a cloud computing environment, in accordance with embodiments of the present disclosure.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 720-1, desktop computer 720-2, laptop computer 720-3, and/or automobile computer system 720-4 may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 720-1 to 720-4 shown in FIG. 7 are intended to be illustrative only and that computing nodes 710 and cloud computing environment 700 can communicate with any type of computerized device over any type of network and/or network addressable connection (e.g., using a web browser).

Figure 8:
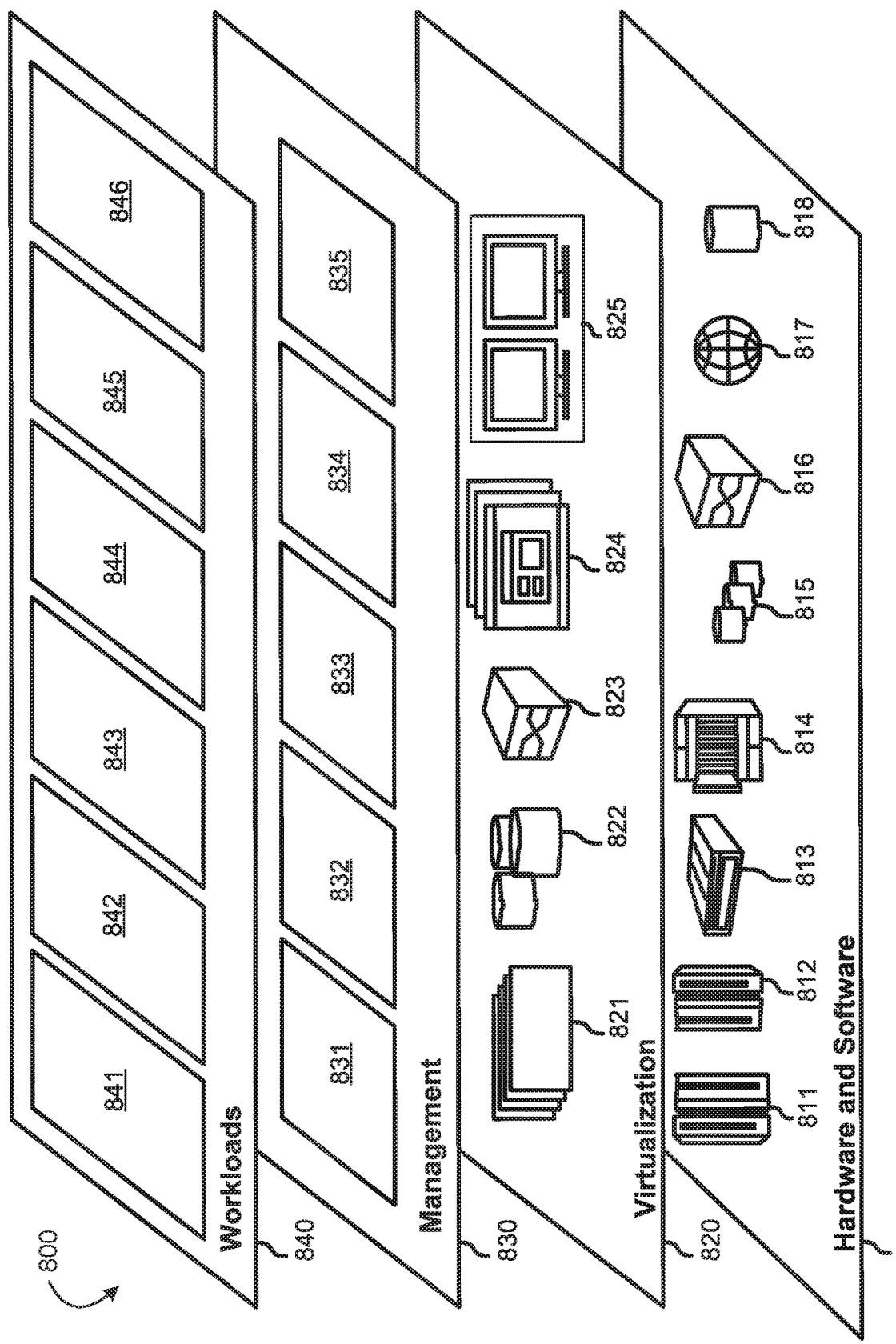
FIG. 8 depicts abstraction model layers, in accordance with embodiments of the present disclosure.

Referring now to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 810 includes hardware and software components. Examples of hardware components include mainframes 811; RISC (Reduced Instruction Set Computer) architecture-based servers 812; servers 813; blade servers 814; storage devices 815; and networks and networking components 816. In some embodiments, software components include network application server software 817 and database software 818.

Virtualization layer 820 provides an abstraction layer from which the following examples of virtual entities may be provided: virtual servers 821; virtual storage 822; virtual networks 823, including virtual private networks; virtual applications and operating systems 824; and virtual clients 825.

In one example, management layer 830 may provide the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 833 provides access to the cloud computing environment for consumers and system administrators. Service level management 834 provides cloud computing resource allocation and management such that required service levels are met. Service Level Agreement (SLA) planning and fulfillment 835 provide pre-arrangement for, and procurement of, cloud computing resources for which a future requirement is anticipated in accordance with an SLA.

Workloads layer 840 provides examples of functionality for which the cloud computing environment may be utilized. Examples of workloads and functions which may be provided from this layer include mapping and navigation 841; software development and lifecycle management 842 (e.g., the perfect forward secrecy system 200); virtual classroom education delivery 843; data analytics processing 844; transaction processing 845; and precision cohort analytics 846.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for providing perfect forward secrecy in a virtual machine, the system comprising:
   a data processing component;
   a physical memory; and
   local data storage having stored thereon computer executable program code, which when executed by the data processing component causes the data processing component to:
   receive, from an application operating within a virtual machine, a secure memory allocation function for a connection secret, wherein the secure memory allocation function includes a memory size parameter;
   allocate memory for the connection secret according to the memory size parameter, wherein the memory includes a memory location and a memory size;

transmit the memory location and the memory size to a virtual machine host to be stored as an entry in a secure database;
store the entry in the secure database;
monitor an operation state relating to the virtual machine;
receive, from the application, a secure reallocation function containing a new memory size for the memory;
resize the memory into the new memory size provided by secure reallocation function;
transmit a new memory location and the new memory size to the virtual machine host to update the entry in the secure database;
sanitize the memory location; and
update the entry relating to the memory stored in the secure database with the new memory location and the new memory size.

2. The computer system of claim 1, further comprising:
receive, from the application, a secure deallocation function relating to the connection secret;
retrieve the entry from the secure database;
deallocate the memory by overwriting the memory location; and
sanitize the memory location indicated by the entry.

3. The computer system of claim 2, wherein the sanitize comprises overwriting the memory location with random data at least once.

4. The computer system of claim 1, wherein the connection secrets include a session key relating to a secure connection between the application and a server.

5. The computer system of claim 1, wherein the secure memory allocation function includes a number of memory blocks parameter.

6. The computer system of claim 1, further comprising:
receive a notice indicating a change to the operation state of the virtual machine;
determine the operation state of the virtual machine;
retrieve the entry from the secure database relating to the virtual machine; and
sanitize, based on the operation state of the virtual machine, the memory location indicated by the entry.

7. The computer system of claim 6, further comprising:
determine the memory, including the connection secret, is stored in storage;
locate a storage location within the storage storing the connection secret; and
sanitize the storage location.

8. A computer-implemented method for providing perfect forward secrecy in a virtual machine, the computer-implemented method comprising:
receiving, from an application operating within a virtual machine, a secure memory allocation function for a connection secret, wherein the secure memory allocation function includes a memory size parameter;
allocating memory for the connection secret according to the memory size parameter, wherein the memory includes a memory location and a memory size;
transmitting the memory location and the memory size to a virtual machine host to be stored as an entry in a secure database;
storing the entry in the secure database;
monitoring an operation state relating to the virtual machine;
receiving, from the application, a secure reallocation function containing a new memory size for the memory;
resizing the memory into the new memory size provided by secure reallocation function;
transmitting a new memory location and the new memory size to the virtual machine host to update the entry in the secure database;
sanitizing the memory location; and
updating the entry relating to the memory stored in the secure database with the new memory location and the new memory size.

9. The computer-implemented method of claim 8, further comprising:
receiving, from the application, a secure deallocation function relating to the connection secret;
retrieving the entry from the secure database;
deallocating the memory by overwriting the memory location; and
sanitizing the physical memory location indicated by the entry.

10. The computer-implemented method of claim 9, wherein sanitizing comprises overwriting the memory location with random data at least once.

11. The computer-implemented method of claim 8, wherein the connection secrets include a session key relating to a secure connection between the application and a server.

12. The computer-implemented method of claim 8, wherein the secure memory allocation function includes a number of memory blocks parameter.

13. The computer-implemented method of claim 8, further comprising:
receiving a notice indicating a change to the operation state of the virtual machine;
determining the operation state of the virtual machine;
retrieving the entry from the secure database relating to the virtual machine; and
sanitizing, based on the operation state of the virtual machine, the memory location indicated by the entry.

14. The computer-implemented method of claim 8, further comprising:
determining the memory, including the connection secret, is stored in storage;
locating a storage location within the storage storing the connection secret; and
sanitizing the storage location.

15. A non-transitory computer-readable storage medium having stored thereon instruction for controlling a computer system to:
receiving, from an application operating within a virtual machine, a secure memory allocation function for a connection secret, wherein the secure memory allocation function includes a memory size parameter;
allocating memory for the connection secret according to the memory size parameter, wherein the memory includes a memory location and a memory size;
transmitting the memory location and the memory size to a virtual machine host to be stored as an entry in a secure database;
storing the entry in the secure database;
monitoring an operation state relating to the virtual machine;
receiving, from the application, a secure reallocation function containing a new memory size for the memory;
resizing the memory into the new memory size provided by secure reallocation function;
transmitting a new memory location and the new memory size to the virtual machine host to update the entry in the secure database;
sanitizing the memory location; and updating the entry relating to the memory stored in the secure database with the new memory location and the new memory size.

16. The non-transitory computer-readable storage medium of claim 15, further comprising:
receiving, from the application, a secure deallocation function relating to the connection secret;
retrieving the entry from the secure database;
deallocating the memory by overwriting the memory location; and
sanitizing the physical memory location indicated by the entry.

17. The non-transitory computer-readable storage medium of claim 15, further comprising:
receiving a notice indicating a change to the operation state of the virtual machine;
determining the operation state of the virtual machine;
retrieving the entry from the secure database relating to the virtual machine; and
sanitizing, based on the operation state of the virtual machine, the memory location indicated by the entry.

\* \* \* \* \*